Dec. 11, 1945.   L. J. KOCI   2,390,948
COMPENSATING THERMOSTAT
Filed Oct. 25, 1943
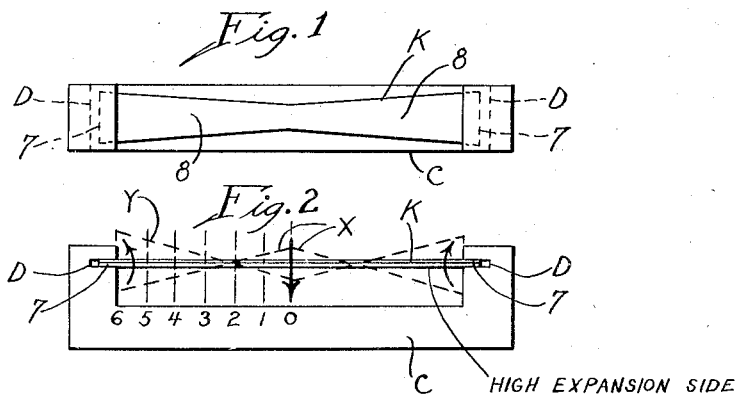
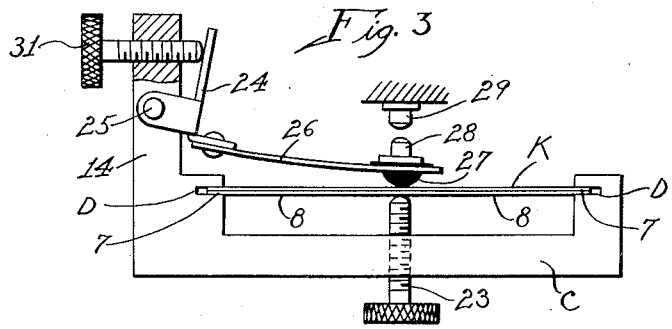
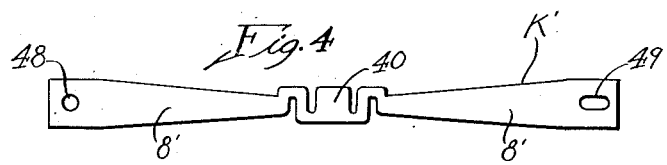
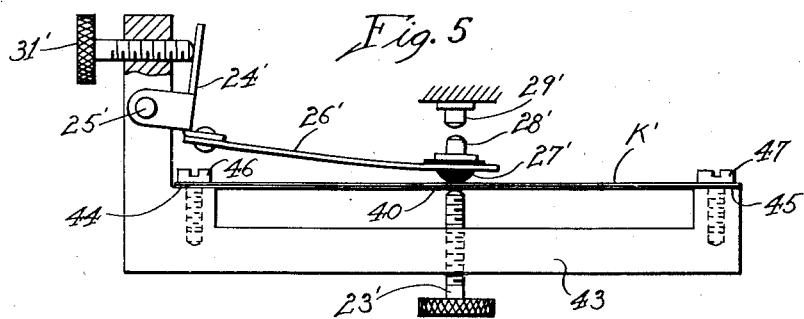
Inventor.
Ludvik J. Koci
By McCanna, Wintercorn & Morsbach
Attys.

Patented Dec. 11, 1945

2,390,948

UNITED STATES PATENT OFFICE 2,390,948

COMPENSATING THERMOSTAT

Ludvik J. Koci, Chicago, Ill., assignor to Chicago Flexible Shaft Company, Chicago, Ill., a corporation of Illinois Application October 25, 1943, Serial No. 507,531

3 Claims. (Cl. 297—15)

This invention relates to compensating thermostats embodying the principle of my application Serial No. 327,255, filed April 1, 1940, for Thermostats which resulted in Patent No. 2,332,518, granted October 26, 1943, and this application is a continuation-in-part thereof.

The novel principle of said patent may be described thus: that if one portion of a generally straight strip of unreversed bimetallic material (of any normal shape and variation in section modulus) is rigidly fastened or restrained against both angular and translational motion and a second portion of the strip at a point longitudinally removed from said first mentioned portion is subject to action including a reactive couple or moment acting to restrain angular motion of said second portion by permitting minimum restraint to translational motion of said second portion in a direction normal to the general length of the strip, then said second portion will exhibit a thermostatic action in the line of said direction but directed in one way or the opposite depending on whether said second portion or the portion immediately adjacent to said rigidly fastened portion, is heated. Said invention is claimed generically in said parent application and also claimed as to certain species which include the principle that the relative magnitude of the two opposite thermostatic actions above described can be varied by variation of the effective section modulus of the strip or by other means which may serve to alter the degree of restraint to angular motion of said second portion.

The present invention has for its object the embodiment of the foregoing principle in a form characterized by a strip of thermostatic material diminishing in width from its terminal ends to a point medially between the ends. This has particular utility in cases where it is desired to control the temperature of a block of metal or body and to compensate for the lag in temperature rise of those portions of the thermostatic strip acting in the direction of primary response but not in immediate contact with said block. In the preferred embodiment two main thermostatic portions are provided each of decreasing graduated rigidity from a terminal end to a medial point, these main portions being integrated at the narrow end referred to as a medial point and being supported at the terminal end on a metal block or other part the temperature of which is to be controlled. In this case the thermostat responds mainly to the temperature of the supporting block or body and compensates for the ambient temperature surrounding the middle portions.

Other objects and attendant advantages will be appreciated by those skilled in this art as the invention becomes better understood by reference to the following description when considered in connection with the accompanying drawing, in which—

Figure 1 is a plan view of a thermostat embodying the present invention;

Figure 2 is a side elevation of the structure shown in Fig. 1;

Figure 3 shows an application of my invention in a thermostatic switch or means for making and breaking an electric circuit;

Figure 4 is a plan view of a thermostatic strip designed for a modified mounting, in accordance with my invention; and Figure 5 is a side elevation of the modified form, incorporated in a thermostatic switch.

Reference is made to the above mentioned patent for a further description of the novel principle first above described, whereby a main thermostatic action in one direction and a compensating thermostatic action in the opposite direction are obtained in a single strip of non-reversed, non-reentrant, thermostatic material, to obtain a net thermostatic action in a direction normal to the general length of the strip. In said patent I have used the terms "A effect" and "B effect" in explaining the thermostatic action; and these terms will be used in a similar manner, hereinafter.

In Figures 1, 2, and 3 are shown a diagramatic embodiment of the present invention. Here, the letter C designates a frame structure having upstanding ends provided with coplanar slots D within which the end portions of a bimetallic strip K are positioned so as to be free to have longitudinal movement under temperature changes. The strip K preferably but not necessarily of uniform thickness, is shaped so as to be diminishing in width from its terminal ends 7 to a point medially between the ends whereby to provide opposite main portions 8 each of decreasing graduated rigidity from its terminal end to said medial point and at such point integrated with the other main portion. Assuming that the under side of the strip is the high temperature side, if the strip is heated at its end portions as by conduction from the frame structure C, the central portion of the strip will tend to move upwardly in the direction indicated by the end arrows in Figure 2, this being the "A effect" above mentioned; and conversely, if the central portion of the strip is heated to a temperature above that of the end portions the strip will tend to move downwardly at the central portion in the direction indicated by the center arrow in Figure 2, this being the "B effect" above mentioned. If the thermostatic strip were of uniform section modulus throughout its length a uniform change in temperature of the strip throughout its length would produce no lateral movement of the strip, that is, movement normal to the face of the strip, for the reason that the A and B effects would be equal and the tendency of the middle portion of the strip to move downward would be exactly balanced by the tendency of the end portions to move the middle portion upward. It will be seen that if one of these effects can be caused to predominate, the balance will be disturbed and the net movement in one direction or the other with uniform change in temperature of the strip, can be produced. This net movement is the resultant thermostatic action in a direction normal to the general length of the strip and may be described as the vector sum of the A and B effects.

Referring to Figure 2, I have illustrated graphically and diagrammatically the thermostatic action when heat is applied to different portions of the strip along its length. For example, if the middle portion of the strip at the section line 0 is heated, say 10 degrees, the middle portion of the strip will move downward in proportion to the width of the section diagram X at said section line 0. This is the B effect. This effect diminishes as the point of heat application moves toward the left or the right; for example, if now a point at the section line 1 is heated 10 degrees, motion at the middle portion of the strip at section line 0 will move downward an amount proportional to the width of the section diagram X at said section line 1. If the strip is similarly heated 10° at the section line 2, there will result no motion of the middle portion of the strip, for the reason that this section 2 is located at the nodal point of the diagram, that is, the point at which the thermostatic action reverses. If the strip is heated 10° at the section line 3 the thermostatic action will be in the opposite direction, that is, upward and of relative magnitude indicated by the width of the section diagram Y at said section line 3. The relative magnitude of the thermostatic response increases if the strip is heated closer to its terminal end, to the extent indicated at the section lines 4, 5, and 6, respectively. This description as well as the diagram is theoretical for the purpose of illustrating the principle; and it will be apparent that the width of the section diagrams X and Y represents relative magnitude of deflection of the strip at the middle point 0 in response to a unit rise in temperature at any given point along its length, also that the example of a unit rise of 10° at any given section line is theoretical because actually there is gradual heat conduction to adjoining portions of the strip.

The diagram Figure 2 shows a very desirable characteristic of my invention, namely, that of a gradually reducing thermostatic response in one direction, passing through a nodal point (i. e., the point of no response), and then into a gradually increasing response in the opposite direction, considering the effect of the application of heat to successive points along the length of the strip. This is of particular utility when compared with prior compensating thermostats; for example, prior instances of applying compensation usually have involved the use of a second thermostat distinct from the main thermostat and acting in a direction opposite from the main thermostat, or a second thermostat fastened to the otherwise free end of the main thermostat but reversed in the location of its high temperature side. If we consider the effect of the application of heat to successive points along the length of the latter mentioned structure it would be apparent that as we proceed from the fixed end of the main thermostat strip we would obtain gradually decreasing thermostatic action in one direction as far as motion of the free end of the strip is concerned until we encounter the junction of the two strips at which there would be a very sudden transition to maximum thermostatic action in the opposite direction followed by gradually decreasing thermostatic action in this same opposite direction as we approach the free end of this combination strip. As distinguished from such prior structures, my invention locates that portion of the thermostat having maximum primary thermostatic response closest to the region of the temperature which it is desired to control and locates that portion of the thermostat possessing maximum opposition or compensating response in a region closest to that region whose temperature variations it is desired to compensate. In practical cases these two regions are seldom separated by an accurate dividing line or plane but gradually merge one into the other; and for this reason it is highly desirable that the response of the remaining portions (i. e., those possessing less than maximum response) of any compensating thermostat shall show the same characteristic, that is, the gradual merging of the main response into that of the secondary.

In the form Figures 1, 2, and 3, the main thermostatic response is obtained with respect to the temperature of the support at the ends of the strip, and secondary or compensating response is obtained with respect to temperature existing at the medial or middle portion. Thus, such a form might well be applied where it is desired to control the temperature of a block of metal or the like to compensate for the lag in temperature rise of these portions of the thermostatic strip not in immediate contact with said block. For example, in the control of temperature of a device wherein it is desired to fasten both end portions of a bimetallic strip in equal contact with the metal constituting the block or part of the device to be controlled and the remaining portion of the strip is more or less free or out of contact from said part in order to obtain a useful deflection for purposes of control, this last portion of the strip not in immediate contact with said part will consequently lag behind a temperature rise of said block especially if said block changes temperature at a very rapid rate. Because the middle portion of the thermostat strip will show the greatest lag with respect to temperature change occurring in the supporting block and because this middle portion acts in a direction opposite from the end portions immediately adjacent to this supporting block, the middle portion is able to adequately compensate for the previously mentioned lag. In this form which has a variation in section modulus throughout the length of the strip, a net deflection would be obtained if all parts of the strip are heated equally, that is, such a form would show net response to both absolute temperature and also a secondary response proportional to temperature difference existing between the middle portion and the end portions.

In Figure 3 I have shown the thermostatic strip

K applied in a thermostatic switch for controlling an electric circuit. This mounting of the strip K is the same as in Figures 1 and 2. A screw 23 threaded in the frame portion C is arranged for adjustment to act as a stop to limit the downward movement of the strip intermediate its ends, in this instance at the middle point. A lever 24 pivoted at 25 to an upright portion 14 of the frame, carries a leaf spring 26 which extends forwardly along the strip K and carries on its under side an insulation button 27 adapted to contact the strip and on its top side a contact 28 positioned to engage a stationary contact 29 to control a circuit (not shown) for exercising a control function. A thumb screw 31 in the end portion 14 permits of adjustment of the position of the lever 24 and the spring 26 whereby to apply more or less lateral pressure on the strip and thus change the temperature at which the strip will act to flex the spring 26 and move the contact 28 into or out of engagement with the contact 29. The stationary contact 29 also acts as a stop to limit the upward movement of the strip. Here, the thermostatic strip is mounted in the same manner as in Figures 1 and 2 so that its end portions are subject to angular restraint and to the reactive couple explained in my parent application, by permitting a limited amount of movement in a direction along the length of the strip in the slots D—D provided for reception of these ends. Theoretically, the thermostatic action is as described above in reference to Figures 1 and 2. However, this form is limited in its applications because of the resistance to sliding motion of the portions 7 of the strip in the slots D—D. In actual practice I prefer to rigidly clamp the terminal end portions 7 of the strip against both angular and longitudinal movement and to provide some degree of elastic softness in the longitudinal direction applied at the medial point or portion of the strip. Therefore, I have shown in Figures 4 and 5, a form in which the desired softness lengthwise of the strip is provided by a serpentine configuration 40 which connects and integrates the main portions 8'. In many instances the required compensating action is of such small magnitude that considerable reduction in effective section modulus of the middle portion of the strip is necessary. Rather than reducing the width to a very small value I have found it better to give the middle portion a serpentine configuration as shown in Figure 4. This not only reduces the effective section modulus to the desired low value but provides a desirable degree of longitudinal softness which permits an extended range of motion of the middle portion normal to the length of the strip. Another advantage resulting from the use of such a serpentine configuration to reduce this section modulus applied to the middle portion is distributed over a larger volume of material than would result if the section modulus were reduced to the same equivalent value merely by a narrowing of the width of the strip. In this form the strip K' is supported in a frame structure similar to that of Figures 1, 2, and 3, having a central portion 43 provided with supporting abutments 44 and 45, against the upper surface of which are secured the end portions of the strip K' by suitable means such as large headed screws 46 and 47, the screws passing through openings 48 and 49, respectively.

These screws serve to secure the terminal ends of the strip against the supporting abutments 44 and 45 and to prevent relative angular movement of said ends of the strip. Said screws 46 and 47 also hold the strip under lengthwise compression. With this construction it is possible to obtain friction-free snap action operation of the switch of a degree determined by the amount of longitudinal compressive stress to which the strip is subjected. In other respects the thermostatic switch of Figure 5 is the same as in Figure 3 and like reference numerals with prime marks are applied to like parts.

It is believed that this invention provides a compensating thermostat which is desirable from the viewpoint of efficiency, dependability, accuracy, economy in cost of manufacture, and maximum freedom from the effect of transient conditions.

While I have described and illustrated specific embodiments of the invention, this has been by way of illustration and not limitation, and I do not wish to be limited except as required by the prior art and the appended claims, in which I claim:

1. A thermostatic device for indicating or controlling the temperature of a primary medium and for compensating for the effect of variations in temperature of an uncontrolled second medium, comprising a non-reversed, non-reentrant strip of thermostatic material, the strip diminishing in width from its terminal ends to a point medially between the ends whereby to provide opposite main portions each of decreasing graduated rigidity, means supporting each terminal end of the strip against both angular motion and motion in a direction normal to its length, the entire length of the strip intermediate the supported terminal ends being responsive to temperature changes throughout said length, said central portion of diminishing width being primarily responsive to the surrounding medium and thereby responding in a thermostatic action in one direction normal to the length of the strip, the end portions of greatest width being primarily responsive to the temperature of said supporting means and thereby responding in a thermostatic action opposite in direction from that of the first described thermostatic action, the thermostatic strip responding at its central portion in a net effective thermostatic action which is the vector sum of the first and second described thermostatic actions and thus in the direction of that described thermostatic action which predominates, whereby to obtain a main response to the temperature of the support at the ends of the strip and to compensate for the effect of variations in temperature of the medium surrounding the middle portion of the strip.

2. A thermostatic device as set forth in claim 1, in which the terminal ends of the thermostatic strip are fixedly held against movement in a direction lengthwise of the strip, and in which the strip at the described medial point is shaped to provide elasticity lengthwise of the strip.

3. A thermostatic device as set forth in claim 1, in which the terminal ends of the thermostatic strip are fixedly held in such manner as to compressively stress the strip in a longitudinal direction so as to obtain snap-acting operation.

LUDVIK J. KOCI.